J. MILLAR.
BELT HINGE FASTENER.
APPLICATION FILED JAN. 29, 1918.
1,283,442.
Patented Oct. 29, 1918.
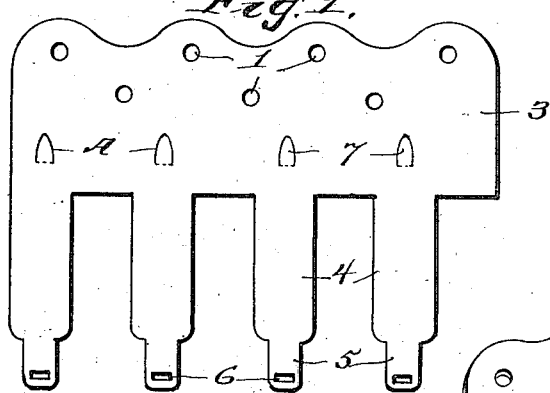
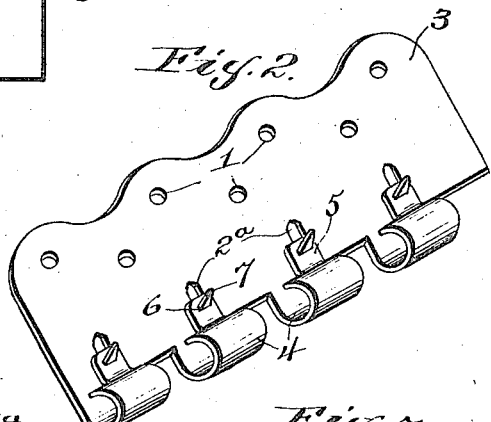
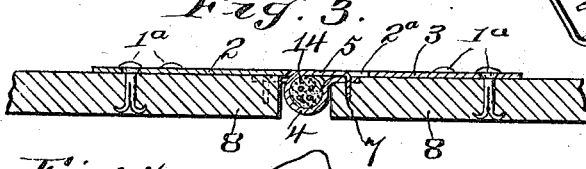
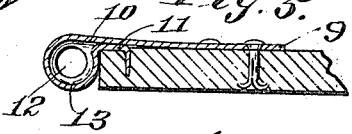
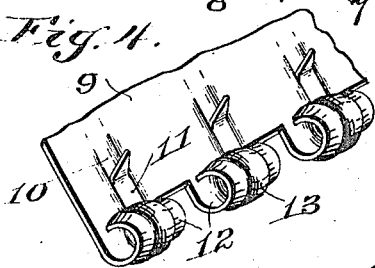
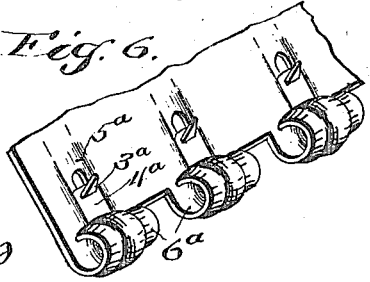
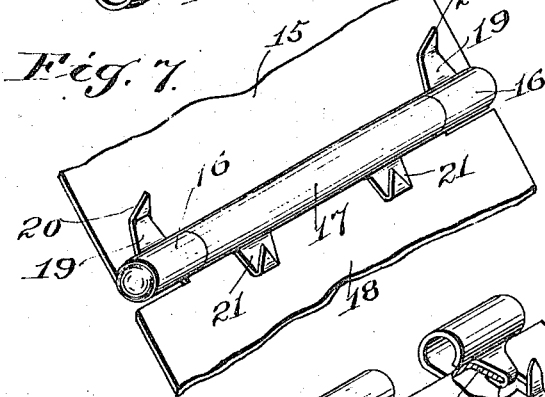
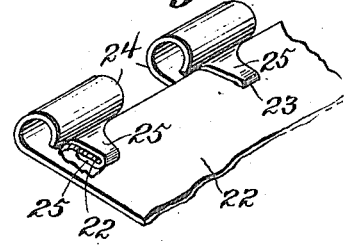
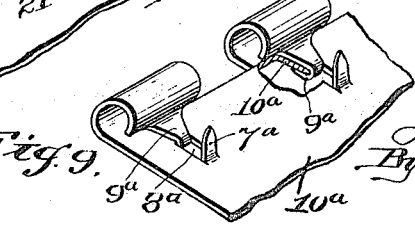
Inventor:
John Millar
By C. F. Belt
Attorney.

UNITED STATES PATENT OFFICE.

JOHN MILLAR, OF CINCINNATI, OHIO.

BELT HINGE-FASTENER.

1,283,442.  Specification of Letters Patent.  Patented Oct. 29, 1918.

Application filed January 29, 1918. Serial No. 214,307.

*To all whom it may concern:*

Be it known that I, JOHN MILLAR, a citizen of the United States, residing at Cincinnati, in the county of Hamilton and State of Ohio, have invented certain new and useful Improvements in Belt Hinge-Fasteners, of which the following is a specification.

This invention relates to belt fasteners, and pertains especially to the class of hinge-fasteners, such as patented by me April 10, 1916, No. 817,501, upon which the subject of this application comprises various improvements.

Knowing the desirability and advantages of keeping the pulley-engaging face of belts free of metallic fastening devices, and the importance of hinging belt ends together so that the hinge-eyes and other parts of the hinge fastenings will not engage the belt pulleys, and the further importance of attaching the hinge-members to the belt ends so that the fastenings will hold to the belt without injuring or weakening the belt ends, I have designed special securing features in the hinge eyes which are formed in and dropped from the meeting edges of belt-attached members so that the eye-securing features or members may be forced into the belt from the outer face thereof without projecting through the belt upon the inner face thereof. I have also devised special tongue and slot locking members in the hinge plates, whereby the tongues are made to lock the eye members to the hinge plate upon the outer face of the hinge-connected belt ends.

The invention further comprises a special hinge pin of novel and peculiar composition of material and parts so assembled as to afford less friction between the pin and the hinge eyes, as will be hereinafter particularly described. With these and various other objects and advantages in view, the invention consists in the novel and peculiar construction and arrangement of parts, as will be hereinafter fully described.

In the accompanying drawings forming part of this application:

Figure 1 is a plan view of a hinge plate stamped or cut preparatory to shaping the eyes.

Fig. 2 is an inverted perspective view of such a plate as shown in Fig. 1 having the eyes and tongues shaped for application.

Fig. 3 is a sectional view showing the application of a pair of the plates, as shown in Fig. 2, connecting the ends of a belt. Fig. 4 is an inverted perspective view of part of a grooved plate.

Fig. 5 is a sectional view of one end of a belt showing a hinge plate without slots, as shown in Fig. 4.

Fig. 6 is an inverted perspective view of a slotted and grooved hinge plate.

Fig. 7 is a similar view showing a hinge plate without grooves and slots.

Fig. 8 is an inverted perspective view showing a modification of the tongue and slot locks. Fig. 9 is a similar view of a further modification.

The same reference characters denote the same parts throughout the several views of the drawings.

The various hinge plates shown in the drawings have holes 1, for suitable rivets 1ª, and the plates 2 and 3 have a plurality of eye-forming members 4 projecting from their adjacent edges, with a space between the members of each plate, and the end of the members 4 has a central extension 5, provided with a slot 6. The plates are slitted at A, to form tongues 7, adapted to be bent so as to project from the inner face of the plates. When the members 4 are shaped into eye-form the extensions 5 engage the inner face of the plates with the tongues 7 extending through the slots 6 and into the ends of the belt 8 without extending through the belt. Obviously the end of the tongues may be bent or clenched upon the face of the members 5, if desired instead of having them project into the belt, but the latter is preferable for anchoring the plates during the operation of riveting the plates to the belt, and for this reason the end of the tongues is tapered or pointed. It will be seen that the end 5 of the members 4 are locked upon the inner or under side of the plates, and the tongue openings 2ª, left in the plates may be occupied by portions of the belt being pressed thereinto during the operation of securing the plates to the outer face of the belt. The plates and eye members may be corrugated or grooved as shown in Figs. 4 and 5, wherein the plate 9 has corrugations or grooves 10 forming a seat for the tongue protections 11 and said grooves extend into the eye members 12 so as to form therein a centrally raised web or rib 13. The end of the tongues are pointed for clenching the belt without extending therethrough. The ribs 13 not only strengthen the eyes but lessen the friction between the hinge pin and the eyes during the running of a belt.

The hinge pin 14 is preferably composed of a combination of fabric or textile material and strands of wire so braided, woven or laced together as to afford sufficient stiffness and yet flexible enough to permit the hinge eyes to adjust themselves thereto, and also to afford sufficient resiliency to permit some expansion of the belt under undue or accidental strain during operation so as to prevent the usual belt breaking under such conditions. The pins being composed in most part of fabric or textile material, the usual friction between metallic pins, or even raw hide pins, is avoided. In Fig. 6 the tongues 3$^a$ are cut out of the grooves 5$^a$ and extend through a slotted extension 4$^a$ of the eyes 6$^a$.

Referring to the modification shown in Fig. 7 of the drawings, the plate 15 is without the slots and grooves hereinbefore mentioned, and said plate has an eye 16 at each end with a space between the eyes for an eye-member 17 central of a companion plate 18. The eyes 16 have central extensions 19 projecting therefrom in engagement with the under side of the plate 15, and terminate in pointed clenching prongs 20 at right angles to the extensions 19. The eye-member 17 has a pair of right angle pronged extensions 21 of the same character and purpose as the pronged extensions 19. All of said extensions are adapted to be pressed into the outer face of a belt with the prongs extending into the belt without projecting through to the inner face of the belt.

Referring to the modification shown in Fig. 8 of the drawings, the plate 22, has slots 23 adjacent to the eyes 24, and the latter are provided with tongue extensions 25 which extend through the slots 23 and are clenched upon the outer face of the plate. This plate and its eyes may be corrugated as and for the purposes hereinbefore described.

It will be observed that the eyes are of such size as to be of less diameter than the thickness of the belt to which they are applied; that the eye extensions, whether slotted or not, are impressed upon the outer face of the belt; and that the tongues and prongs anchor the plates adjacent to the belt ends without extending therethrough, so that said ends are held in proper position relative to the eyes and prevented from sagging or becoming loosened between the riveted portions of the plate and the eye portions of the plate, and this without weakening the connected ends of the belt.

Having thus described my invention what I claim as new and desire to secure by Letters Patent is:

1. A hinge fastener for belts comprising a pair of plates the meeting edges of which have hinge eye extensions, tongues struck out of the plates opposite the extensions and projecting from the under face of the plates and extending through said extensions into the upper face of the belt.

2. A hinge fastener for belts comprising a pair of plates the meeting edges of which have hinge eyes, extensions of the eyes having a slot in the end thereof, pointed tongues struck out of the plates lengthwise the latter and projecting from the under face of the plates and extending through the slots and into the upper face of the belt, and a pin extending through the eyes for connecting the plates.

3. A hinge fastener for belts comprising a pair of plates having hinge eyes in the meeting edges thereof, a plurality of tongues struck out the plates lengthwise and projecting from the under face of the plate into the upper face of the belt and leaving elongated openings in the plates adjacent to said edges, and a plurality of hinge eye extensions engaging said openings and coöperating with the tongues in clenching the extensions to the plates and the latter to the belt.

In witness whereof I hereunto set my hand in the presence of two witnesses.

JOHN MILLAR.

Witnesses:
C. T. BELT,
J. D. BOWLING.

Copies of this patent may be obtained for five cents each, by addressing the "Commissioner of Patents, Washington, D. C."